United States Patent [19]

Archibald

[11] 4,003,869
[45] Jan. 18, 1977

[54] ETHYLENE-PROPYLENE COPOLYMER EMULSIONS
[75] Inventor: William E. Archibald, Marietta, Ga.
[73] Assignee: Cosden Technology, Inc., Big Spring, Tex.
[22] Filed: Jan. 13, 1975
[21] Appl. No.: 540,317
[52] U.S. Cl. .............. 260/29.6 XA; 260/29.6 MQ; 260/29.6 ME
[51] Int. Cl.² ........................................ C08L 23/08
[58] Field of Search .......... 260/29.6 XA, 29.6 MQ, 260/29.6 ME, 88.2 R, 94.9 A

[56] References Cited
UNITED STATES PATENTS

| 2,414,311 | 1/1947 | Larson | 260/94.9 A |
| 2,646,425 | 7/1953 | Barry | 260/94.9 A |
| 3,215,646 | 11/1965 | Sawyer, Jr. et al. | 260/29.6 XA |
| 3,226,352 | 12/1965 | Helin et al. | 260/29.6 XA |
| 3,267,060 | 8/1966 | Putnam et al. | 260/29.6 XA |
| 3,296,170 | 1/1967 | Burkhart et al. | 260/94.9 A |

*Primary Examiner*—M. J. Welsh

[57] ABSTRACT

Stable emulsions of ethylene-propylene copolymer are former by copolymerizing ethylene and propylene under elevated temperature and pressure conditions in the presence of an aqueous medium which contains a water soluble free-radical initiator and a nonionic or anionic emulsifier.

12 Claims, No Drawings

ETHYLENE-PROPYLENE COPOLYMER EMULSIONS

BACKGROUND OF THE INVENTION

This invention relates to emulsions of polymeric materials. In another aspect, this invention relates to novel, stable, aqueous emulsions of ethylene-propylene copolymer, and processes of producing the same.

Ethylene-propylene copolymers are known in the art. Ethylene-propylene copolymer emulsions are also known in the art and generally include emulsions of preformed copolymer. More particularly, the ethylene-propylene copolymers are conventionally preformed by solution polymerization, for example, and thereafter the polymer is dispersed in aqueous medium using a suitable emulsifying agent.

One object of this invention is to provide a novel emulsion polymerization process for producing stable polymeric emulsions.

Another object of this invention is to provide a process for producing novel emulsions of ethylene-propylene copolymer.

A further object of this invention is to provide a novel emulsion of ethylene-propylene copolymer which is particularly suitable for use in coating flexible fibrous materials, such as paper and textiles.

According to the present invention, novel emulsions of ethylene-propylene copolymer are produced by copolymerizing ethylene and propylene under elevated temperature and pressure conditions in the presence of an aqueous medium which contains a water soluble free-radical initiator, an emulsifier selected from anionic emulsifiers, nonionic emulsifiers, and mixtures thereof. The emulsified copolymer particles are relatively soft, flexible materials and can be deposited on fibrous materials such as paper and textiles including woven, felt, and knitted fabrics by conventional techniques which generally include deposition of the emulsion on the substrate and removal of the water therefrom by heat and/or reduced pressure. The resulting coating of ethylene-propylene copolymer will tenaciously adhere to the fibrous material and is flexible and therefore, will not crack and peel when the coated material is subjected to flexing movements.

The emulsions produced in accordance with the subject invention generally comprise an aqueous latex of a random copolymer of ethylene and propylene. These copolymers generally have a molecular weight in the range of from about 5,000 to about 40,000. The particle size of the polymer and emulsion can range from about 0.02 to about 1 micron, depending on such things as the type and amount of emulsifier and the degree of agitation imparted to the aqueous medium during the polymerization process.

The emulsions are produced in accordance with this invention by contacting pressurized ethylene with propylene, in the presence of an aqueous medium containing an emulsifier and a water soluble free radical initiator. The polymerization reaction can occur at a temperature within the range of from about 75° to about 150° C, in the presence of from about 0.9 to about 9% by weight of the emulsifier based on the liquid reaction medium, and from about 0.1 to about 1 percent by weight of the water soluble free-radical initiator based on the liquid reaction medium, and under a pressure in the range of from about 1500 to about 5000 psi. The mole ratio of propylene to ethylene which can be used in the scope of this invention falls generally within the range of about 0.20:1 to 1:1.

Conventional water soluble free-radical polymerization initiators can be used in the scope of this invention. The preferred such initiators are the water soluble persulfates, such as alkali metal persulfates including potassium and sodium persulfates, and other water soluble persulfates, e.g., ammonium persulfate and the like.

Although the polymerization can be readily effected in the presence of water as the sole liquid medium, an alcohol such as t-butanol can be included within the aqueous medium. Such aqueous alcoholic medium can contain any amount of the alcohol of the type which favorably influences the polymerization and the resultant emulsion. Thus, up to about 35 percent by weight based on the combined weight of alcohol and water of an alcohol such as t-butanol, can be acceptably included in the polymerization medium with about 7 to 25 percent by weight being most suitable.

Any nonionic or anionic emulsifier or mixture thereof which is non-deleterious to the reaction can be utilized to form the ethylene-propylne copolymer latex in the scope of this invention.

Suitable anionic emulsifiers include the saturated fatty acid salts such as the alkali metal salts and particularly the sodium and potassium salts of saturated fatty acids having about 12 to 18 carbon atoms. Examples of suitable such emulsifiers include the alkali metal salts of myristic acid, lauric acid, stearic acid and the like. Other suitable anionic emulsifiers include the alkali metal salts and particularly the sodium and potassium salts of alkyl aryl sulfonic acids and preferably the alkali metal alkyl benzene sulfonates wherein the alkyl group is a straight or branched chain group which contains from about 6 to about 18 carbon atoms. Examples of suitable such materials include the sodium and potassium salts of dodecyl benzene sulfonic acid, nonyl benzene sulfonic acid, undecyl benzene sulfonic acid, tetradecyl benzene sulfonic acid, hexadecyl benzene sulfonic acid, mixtures thereof, and the like.

Further anionic emulsifiers which can be used in the scope of this invention include the salts and particularly the alkali metal salts of sulfates of fatty alcohols having about 12 to 18 carbon atoms or mixtures thereof and salts and particularly alkali metal salts of sulfates of ethoxylated fatty alcohols having about 12 – 18 carbon atoms and an average number of ethoxy groups between 1 and 5. Examples of such materials include sodium sulfates of $C_{12}$ alcohols, sodium tridecyl alcohol sulfate, and the sodium salt of ethoxylated lauryl sulfate having an average of about 1.5 ethoxy groups.

When utilizing the anionic emulsifiers and particularly the acid salts, the pH of the reaction medium should be maintained within the range of from about 8.5 to about 14 by use of basic materials such as sodium hydroxide or potassium hydroxide.

In addition, especially when utilizing the acid salts, particularly of the saturated fatty acids having about 12 to 18 carbon atoms, a pH adjuster can be present in the aqueous phase to prevent displacement, by stronger acids, of the weak acid component of the emulsifier, e.g., fatty acid soaps. The pH adjusters employed in this instance, are those which in nature and amount used will result in a pH of at least about 8.5 in the product removed from the reactor. Since acid is formed during the polymerization, the pH at the time polymerization is initiated, is preferably somewhat higher, suitably about 10.5. Alkaline substances having a pH of about 10.5 are for example, potassium phosphates such as tripotassium phosphate, and potassium carbonate, which substances are also buffers. To give the desired pH values, tripotassium phosphate, for example, is added to the aqueous medium in amounts between about 0.25 percent and about 0.7 percent by weight. To maintain the pH, nonbuffering alkalies such as KOH or NaOH can be added to the aqueous medium during the course of the reaction. Furthermore, if the alkyl sulfate type emulsifiers are utilized, the pH adjuster can be omitted, since these materials are acid stable to a pH of about 4.

Nonionic emulsifiers which can be used in the scope of this invention are the nonionic alkylphenoxy polyoxyethylene ethanols and preferably the alkylphenoxy polyoxyethylene ethanol emulsifiers having the general formula:

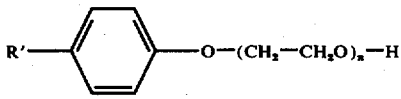

Wherein R' is an alkyl chain having 8 or 9 carbon atoms advisably branched such as a polypropylene or polybutylene chain and n represents an average of 7 to about 15. Some examples of suitable such emulsifiers are as follows:

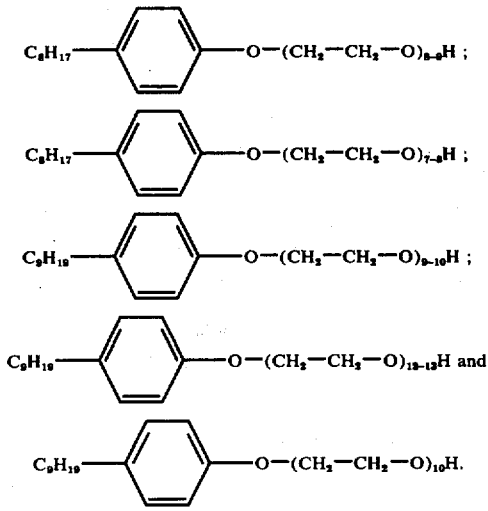

Generally, the amount of emulsifier, as well as the amount of the water soluble free-radical initiator and the temperature and pressure of the process will vary with the particular emulsifier which is utilized in order to obtain the most effective results within the scope of this invention. For example, when utilizing the above-described salts of saturated fatty acids or salts of sulfates of fatty alcohols or salts of sulfates of ethoxylated fatty alcohols as emulsifiers, it is generally desirable to conduct the process with a polymerization initiator content in the range of from about 0.12 to about 1.0 percent by weight of the aqueous phase, and even more preferably the initiator should be in the range of from about 0.1 to about 0.3 percent by weight of the aqueous phase. Furthermore, the emulsifier should be present in an amount in the range of from about 0.9 to about 9 percent by weight of the aqueous phase and even more preferably, an amount in the range of from about 1.5 to about 3.5 percent by weight of the aqueous phase. Furthermore, the emulsion polymerization can be carried out at a temperature within the range of from about 75° C to about 150° C and even more preferably at a temperature in the range of from about 80° C to about 90° C. Furthermore, this process can be carried out at a pressure in the range of from about 1500 to about 5000 psi and preferably at a pressure in the range of from about 2000 psi to about 3000 psi.

When operating with the above-described alkyl aryl sulfonate salts as emulsifiers, the polymerization is preferably carried out in the presence of the free-radical initiator in an amount in the range of about 0.16 to about 1.0 and preferably from about 0.5 to about 0.7 percent by weight of the aqueous medium. Furthermore, the emulsifier should be present in an amount in the range of from about 1.0 to about 5.0 percent by weight of the aqueous medium and preferably in the amount in the range of from about 2.0 to about 4.0 percent by weight of the aqueous medium. The reaction can occur at a pressure in the range of from about 1900 to about 5000 psi, and preferably at a pressure in the range of from about 2000 to about 3000 psi. The temperature of the reaction can be in the range of from about 75° C to about 150° C and preferably in the range of from about 80° C to about 100° C.

When utilizing the above-described nonionic emulsifiers within the scope of this invention, the reaction is preferably carried out in the presence of the free-radical initiator in an amount in the range of from about 0.16 to about 1.00 percent by weight of the aqueous medium and more preferably in an amount in the range of from about 0.5 to about 0.7 weight percent of the aqueous medium. The emulsifier can be present in the range of from about 1.0 to about 5.0 percent by weight of the aqueous medium and more preferably in an amount in the range of from about 2.0 to about 4.0 percent by weight of the aqueous medium. The polymerization can be carried out at a temperature within the range of from about 75° C to about 150° C and more preferably at a temperature in the range of from about 90° C to about 100° C. Furthermore, the pressure can be in the range from about 1500 psi to about 5000 psi and is preferably within the range of from about 2000 to about 4000 psi.

The reaction can be carried out in either a batch or continuous operation. For example, in carrying out the polymerization process of the present invention, water, the emulsifier, the pH adjuster (if necessary) and t-butanol, (if desired) are combined in any order in the amounts or proportions which are recited above. The components are mixed in, or the premixed aqueous phase is introduced into, a suitable pressure reactor in which fairly vigorous agitation of the contents is possible either by motion of the reactor or by agitating means disposed within the reactor. The reactor is suitably made of a corrosion-resistant material such as stainless steel, or is equipped with a corrosion-resistant lining such as glass or stainless steel. The reactor is then flushed with polymerization grade (99.8 + % pure) ethylene and/or propylene to remove gaseous oxygen from the system. Preferably, the polymerization grade ethylene and propylene contains less than 10–25 ppm of oxygen.

The reactor is heated to the operating temperature of between about 75° C to about 150° C as set forth above, and the initiator is introduced into the reactor, conveniently dissolved in a portion of the water component of the aqueous medium. The initiator is added to the reaction zone in a sufficient quantity to produce a polymerization rate of about 2–10% per hour.

High pressure polymerization grade ethylene and propylene are introduced into the reactor. It is noted that the propylene can be added to the reaction zone in any suitable manner. For example, it can be admixed with the ethylene in a single pressurized feed stream to the interior of the reactor, or it can be delivered by a first feed stream and admixed with ethylene from a second feed stream within the interior reactor, or if desired, the propylene can be initially liquefied and dissolved within the aqueous medium before ethylene is delivered to the reaction zone. The pressure of the reactants can be dependent upon the emulsifier used as cited above. The reaction proceeds at the temperatures and pressures set forth above with constant vigorous agitation of the liquid contents of the reactor. As the polymerization proceeds, additional ethylene and propylene, if desired, are continuously fed into the reactor to maintain the pressure. The polymerization is permitted to proceed until the emulsion reaches the desired solids content. This may be done by periodically withdrawing samples from the reactor and plotting the solids content as a function of time. A leveling off of the plot of solids content indicates that the reaction is slowing down and the initiator is becoming depleted by thermal decomposition. When this happens, additional initiator can be added in small increments to maintain a polymerization rate of about 2–10 percent per hour. The emulsion produced will generally have a solids content between about 14 and 40 weight percent.

Following the polymerization, any solvent present such as t-butanol can be stripped from the latex and the latex concentrated by distillation under reduced pressure until the solids content is up to about 40–60 weight percent without adverse affect on the stability of the emulsion.

As stated above, the novel ethylene-propylene polymeric emulsions of the subject invention are particularly useful in forming tenaceous, flexible coatings on fibrous materials such as paper and textiles. In essence, the resulting copolymer has a lower crystallarity than emulsion-produced polyethylene, and therefore the copolymer is both soft and flexible. Accordingly, a polymer coating can be deposited on a suitable fibrous substrate by conventional techniques. The resulting coating will tenaceously adhere to the fibrous substrate but yet will be extremely flexible and will not crack or peel off when subjected to flexing.

The following examples are set forth to better facilitate the understanding of this invention and are not intended to limit the scope thereof.

EXAMPLE 1

A stainless steel batch reactor equipped with an agitator was loaded with a solution which comprised 1600 parts by weight of deionized water; 65 parts by weight of dodecyl benzene sulfonic acid; and 14.2 parts by weight of potassium hydroxide. The reactor was sealed and the headspace was purged by evacuating and filling with ethylene at greater than atmospheric pressure and then venting off the ethylene to atmospheric pressure and repeating this filling and venting operation. Next, polymerization grade ethylene and propylene at a pressure of 2200 psig was admitted into the reactor. The mole ratio of propylene to ethylene was maintained in the reactor at about 1:3. The agitator was started and the reactor was heated to a temperature of 80° C. Next, 200 parts by weight of the solution prepared by dissolving 8.7 parts by weight of $K_2S_2O_8$ in 500 parts by weight of water as pumped into the reactor corresponding to 40 weight percent of potassium persulate in the charge. The reaction started immediately. The catalyst solution was periodically added to the reactor to maintain a polymerization rate of about 2.5 percent per hour. The temperature was maintained between about 80° and 97° C during the entire reaction and the contents were agitated constantly at 1500 rpm by the agitator. Pressure was maintained from 1700 psig to 2200 psig during the run by admitting ethylene and propylene into the reactor as required. After a reaction time of 8½ hours, the reactor was cooled. The product emulsion contained 14.1 percent by weight of solids and was a clear stable emulsion of very fine particle size. The product emulsion was a fluid milky-latex with no sediment or visible solid particles present. It was concentrated to 38.2 percent total solids by evaporation. The stripped product was a fluid, milky-latex exhibiting a viscosity of 26.5 centipoises at 25° C determined with a Brookfield Viscometer using spindle No. 1 at 60 rpm. The pH of the concentrated latex was 10.1, the surface tension was 37 dynes per cm. The average particle diameter of the copolymer was 0.02–0.5 microns. The solid copolymer in the latex was about 25 weight percent propylene.

EXAMPLE 2

A reactor as described in Example 1 is loaded with a solution of 1720 parts by weight of deionized water; 59 parts by weight of myristic acid; and 11 parts by weight of potassium hydroxide. The reactor is sealed and the headspace purged by evacuating and filling with ethylene at greater than atmospheric pressure and then venting off the ethylene to atmospheric pressure and repeating this filling and venting operation. Next, polymerization grade ethylene and propylene at a pressure of about 2200 psig is admitted into the reactor. The mole ratio of propylene to ethylene is maintained in the reactor at about 1:3. The agitator is started and the reactor is heated to a temperature of 80°–90° C. Next, 100 parts by weight of the solution prepared by dissolving 5 parts by weight of $K_2S_2O_8$ in 250 parts by weight of water is pumped into the reactor corresponding to 40 weight percent of potassium persulfate in the charge. The reaction is immediately started. The catalyst solution is periodically added to the reactor to maintain a polymerization rate of about 2.5 percent per hour. The temperature is maintained between about 80° C and 90° C and the contents are agitated constantly during the entire reaction. Pressure is maintained from 2000 psig to 2500 psig during the run by admitting ethylene and propylene into the reactor as required. After a reaction time of 8 hours, the reactor is cooled. The product emulsion contains 17.5 percent by weight of solids and is a fluid milky-latex with no sediment or visible solid particles present.

EXAMPLE 3

A reactor as described in Example 1 is loaded with a solution of 1680 parts by weight of deionized water; 64 parts by weight of

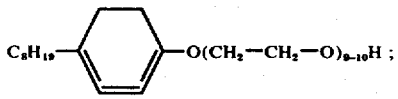

and 2 parts by weight of potassium hydroxide. The reactor is sealed and the headspace purged by evacuating and filling with ethylene at greater than atmospheric pressure and then venting off the ethylene to atmospheric pressure and repeating this filling and venting operation. Next, polymerization grade ethylene and propylene at a pressure of 2500 psig is admitted into the reactor. The mole ratio of propylene to ethylene is maintained in the reactor at about 1:3. The agitator is started and the reactor is heated to a temperature of 90°–100° C. Next, 100 parts by weight of the solution prepared by dissolving 6 parts by weight of $K_2S_2O_8$ in 200 parts by weight of water is pumped into the reactor corresponding to 50 weight percent of potassium persulfate in the charge. The reaction starts immediately. The catalyst solution is periodically added to the reactor to maintain a polymerization rate of about 2.5 percent per hour. The temperature is maintained between about 90° and 100° C and the contents are agitated constantly during the entire reaction. Pressure is maintained from 2200 psig to 2700 psig during the run by admitting ethylene and propylene into the reactor as required. After a reaction time of 9 hours, the reactor is cooled. The product emulsion contains 16 percent by weight of solids and is a fluid milky-latex with no sediment or visible solid particles present.

The solid copolymer produced by the processes set forth in Examples 1–3 is relatively soft as compared to stable polyethylene produced by emulsion polymerization techniques, and is flexible and highly suitable for coating on fibrous materials such as paper and textiles.

While this invention has been described in relation to its preferred embodiments, it is to be understood that various modifications thereof will now be apparent to one skilled in the art from reading of this specification and it is intended to cover such embodiments as fall within the scope of the appended claims.

What is claimed is:

1. A process for producing ethylene-propylene copolymer emulsions comprising contacting ethylene and propylene in a reaction zone in the presence of an aqueous medium containing minor amounts of a water-soluble alkali metal persulfate initiator and an emulsifier selected from anionic emulsifiers, nonionic emulsifiers, and mixtures thereof, at a temperature in the range of from about 75° C to about 150° C and at a pressure in the range of from about 1,500 psi to about 5,000 psi for a period of time sufficient to form said ethylene-propylene copolymer, the mole ratio of propylene to ethylene in said reaction zone being maintained in the range of from about 0.2:1 to about 1:1.

2. The process of claim 1 wherein said aqueous solution contains up to about 35 weight percent t-butanol.

3. The product of claim 1 wherein said product has a molecular weight in the range of from about 5,000 to about 40,000.

4. The process of claim 1 wherein said initiator is present in an amount in the range of from about 0.1 to about 1.0 percent by weight of the total aqueous medium.

5. The process of claim 4 wherein said emulsifier is present in an amount in the range of from about 0.9 to about 9.0 percent by weight of the total aqueous medium.

6. The process of claim 1 wherein said emulsifier is an alkali metal salt of an alkyl benzene sulfonic acid wherein the alkyl group has from about 6 to about 18 carbon atoms.

7. The process of claim 6 wherein said initiator is present in an amount ranging from about 0.16 to about 1.0 percent by weight of said aqueous medium and said emulsifier is present in an amount ranging from about 1.0 to about 5.0 percent by weight of said aqueous medium.

8. The process of claim 1 wherein said emulsifier has the general formula of

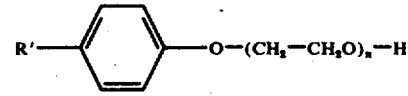

wherein R' is an alkyl chain, having 8 or 9 carbon atoms, and n represents an average of 7 to about 15.

9. The process of claim 8 wherein said initiator is present in an amount in the range of from about 0.16 to about 1.0 percent by weight of said aqueous medium and said emulsifier is present in an amount in the range of from about 1.0 to about 5.0 percent by weight of said aqueous medium.

10. The process of claim 9 wherein said initiator is present in an amount in the range of from about 0.12 to about 1.0 percent by weight of said aqueus medium and said emulsifier is present in an amount in the range of from about 0.9 to about 9 percent by weight of said aqueous medium.

11. The process of claim 1 wherein said emulsifier is a member selected from the group consisting of
   1. a salt of saturated fatty acid having from about 12 to about 18 carbon atoms,
   2. a salt of a sulfate of a saturated fatty alcohol having about 12 to 18 carbon atoms, and
   3. a salt of a sulfate of an ethoxylated saturated fatty alcohol having about 12 to 18 carbon atoms and an average number of ethoxy groups between 1 and 5.

12. The product produced by the process of claim 1.

* * * * *